(12) United States Patent
Stoakes et al.

(10) Patent No.: US 10,228,858 B1
(45) Date of Patent: *Mar. 12, 2019

(54) SYSTEM AND METHOD FOR GRANULAR DEDUPLICATION

(71) Applicant: Violin Systems LLC, San Jose, CA (US)

(72) Inventors: Timothy Stoakes, One Tree Hill (AU); Vikas Ratna, Fremont, CA (US); Amit Garg, Cupertino, CA (US)

(73) Assignee: VIOLIN SYSTEMS LLC, San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/676,401

(22) Filed: Aug. 14, 2017

Related U.S. Application Data

(63) Continuation-in-part of application No. 15/017,046, filed on Feb. 5, 2016, now Pat. No. 9,733,836.

(60) Provisional application No. 62/114,849, filed on Feb. 11, 2015.

(51) Int. Cl.
*G06F 3/06* (2006.01)

(52) U.S. Cl.
CPC ............ *G06F 3/0608* (2013.01); *G06F 3/065* (2013.01); *G06F 3/067* (2013.01); *G06F 3/0619* (2013.01); *G06F 3/0641* (2013.01); *G06F 3/0665* (2013.01)

(58) Field of Classification Search
None
See application file for complete search history.

(56) References Cited

U.S. PATENT DOCUMENTS

| | | | |
|---|---|---|---|
| 8,850,130 B1* | 9/2014 | Aron | G06F 9/52 711/150 |
| 9,191,437 B2* | 11/2015 | Feder | G06F 17/3015 |
| 2011/0137870 A1* | 6/2011 | Feder | H04L 67/1002 707/662 |
| 2012/0226741 A1* | 9/2012 | Tofano | H04L 67/2804 709/203 |
| 2013/0117286 A1* | 5/2013 | Gallant | G06F 7/24 707/752 |
| 2013/0117516 A1* | 5/2013 | Sobolewski | G06F 12/16 711/162 |
| 2013/0227111 A1* | 8/2013 | Wright | G06F 9/5083 709/223 |
| 2013/0232261 A1* | 9/2013 | Wright | H04L 41/50 709/224 |
| 2015/0339587 A1* | 11/2015 | Huang | G06N 3/0436 706/2 |

* cited by examiner

*Primary Examiner* — Kevin Verbrugge
(74) *Attorney, Agent, or Firm* — Schwabe Williamson & Wyatt

(57) ABSTRACT

A method of managing a memory system is described, the memory system having a processor with a client interface, a buffer memory, and a storage memory. A LUN (logical unit) is exposed to the client, the LUN having a memory size, and QoS specification. When the processor receives a command from the client to write data to the LUN, determining if the QoS specification includes deduplication and: if the QoS does not include deduplication, processing the command by storing the data in the storage memory and creating metadata uniquely referencing a storage location of the data that is written; or if the QoS includes deduplication, determine if deduplication is possible while meeting a latency value as specified in the QoS specification and performing deduplication.

16 Claims, 3 Drawing Sheets

SYSTEM AND METHOD FOR GRANULAR DEDUPLICATION

This application is a continuation-in-part of application of U.S. Ser. No. 15/017,046, filed on Feb. 5, 2016 which claims the benefit of U.S. provisional application Ser. No. 62/114,849, filed on Feb. 11, 2015, each of which are incorporated herein by reference.

TECHNICAL FIELD

The subject matter of the present application may be related to data storage systems.

BACKGROUND

Flash memory arrays are replacing disk storage devices in many applications due to the more rapid response time to client requests for reading and writing data as well as a capability to perform a much higher number of input/output (I/O) operations per second. However, at present, the hardware cost of the flash memory is greater than that of disk and the flash memory is perceived to have a wear out problem, at least if not properly managed.

The effective storage capacity of the flash memory system may be increased substantially by the use of deduplication and data compression techniques. However each of these techniques involves computational resources and may increase the latency of the storage system in ingesting and acknowledging write operations and in the response to read operations. In addition, such techniques may need to be harmonized with other data center operations such as replication, snapshots, cloning, and the like, including reconfiguration of the storage space allocated to the user based on changing workload characteristics.

User data may be presented in block format or in file format as each of these formats may be extant in the user environment to take advantage of particular user software programs and to support user applications where the data format is chosen for efficiency in processing or data handling by the user.

At present, deduplication is performed either in-line, by post-processing, or during a data backup process. In a multi-user environment, the processing workloads, input and output latencies, and other time-dependent attributes of the workloads may result in inefficient use of the storage system and data management features, as the choice of the process to be performed is deterministic. Typically deduplication is performed by only one of the three mentioned approaches in a particular storage system. This may result in a variable user experience.

SUMMARY

A method of managing a memory system, comprising: providing a memory system with a processor having a client interface, a buffer memory, and a storage memory; allocating a logical unit (LUN) to the client, the LUN having a memory size, and QoS specification; receiving a command from the client to write data to the LUN; and determining if the QoS specification includes deduplication and: if the QoS does not include deduplication, process the command by storing the data in the storage memory and creating metadata uniquely referencing a storage location of the data that is written; or if the QoS includes deduplication, determine if deduplication is possible while meeting a latency value as specified in the QoS specification and: if deduplication is possible, performing deduplication and creating metadata relating a user address to a physical location where a copy of the data that is written is stored; or, if deduplication is not possible, storing undeduplicated data in a backing LUN associated with a deduplicated LUN, and draining undeduplicated data stored in the backing LUN when deduplication is possible by performing deduplication.

A method of managing a memory system, comprising: maintaining a single instance repository (SIR), the SIR comprising metadata relating a hash value to a location in the memory system where the data is stored; associating a plurality of logical units (LUN), with the SIR, each LUN being exposed to a user and having a stub LUN (SL) relating a user logical block address (LBA) to a hash value of data in the SIR or to a location in the memory system where the data is stored, wherein hash values in the SIR comprise hash values that are referenced by at least one of a plurality of LBAs in a LUN or by a plurality of LUNs; and the SIR is garbage collected by: determining whether the hash value is referenced by one or more LUNs and: in accordance with a policy determined by user quality of service requirements (QoS), evicting the hash value and associated stored data if the hash value is not referenced by any LUN; or evicting the hash value and associated stored data if the hash value is not referenced by any LUN for more than one garbage collection cycle; or evicting the hash value if the hash value is referenced by a LUN and the hash value has not been referenced for a predetermined period of time; maintaining the hash value and associated stored data if the hash value is referenced by more than one LUN.

DETAILED DESCRIPTION

Figure 1:
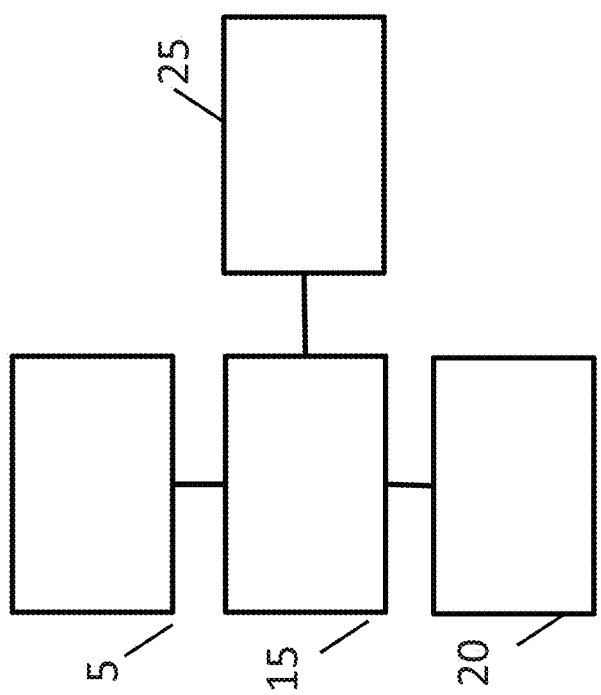
FIG. 1 is a block diagram of an example of a non-volatile memory storage system.

Exemplary embodiments may be better understood with reference to the drawings, but these embodiments are not intended to be of a limiting nature. Like numbered elements in the same or different drawings perform equivalent functions. Elements may be either numbered or designated by acronyms, or both, and the choice between the representation is made merely for clarity, so that an element designated by a numeral, and the same element designated by an acronym or alphanumeric indicator should not be distinguished on that basis.

It will be appreciated that the methods described and the apparatus shown in the figures may be configured or embodied in machine-executable instructions, e.g. software, or in hardware, or in a combination of both. The machine-executable instructions can be used to cause a general-purpose computer, a special-purpose processor, such as a DSP, array processor, or the like, that acts on the instructions to perform functions and actions described herein.

Alternatively, the operations might be performed by specific hardware components that may have hardwired logic or firmware instructions for performing the operations described, or by any combination of programmed computer components and custom hardware components, which may include analog circuits. Such components may include Application Specific Integrated Circuits (ASIC), Field Programmable Gate Arrays (FPGA), or the like which may exist or are being developed and have the capability of configurable logic.

The methods may be provided, at least in part, as a computer program product that may include a non-volatile (non-transient) machine-readable medium having stored thereon instructions which may be used to program a computer (or other electronic devices) to perform the methods. For the purposes of this specification, the terms "machine-readable non-transient medium" shall be taken to include any medium that is capable of storing or encoding a sequence of instructions or data for execution by a computing machine or special-purpose hardware and that may cause the machine or special purpose hardware to be operable to perform any one of the methodologies or functions of the present invention. The term "machine-readable medium" shall accordingly be taken include, but not be limited to, solid-state memories, optical and magnetic disks, magnetic memories, and optical memories, as well as any equivalent device that may be developed for such purpose.

For example, but not by way of limitation, a machine readable medium may include read-only memory (ROM); random access memory (RAM) of all types (e.g., S-RAM, D-RAM. P-RAM); programmable read only memory (PROM); electronically alterable read only memory (EPROM); magnetic random access memory; magnetic disk storage media; Flash memory, which may be NAND or NOR configured; memory resistors; or electrical, optical, acoustical data storage medium, or the like. A volatile memory device such as DRAM may be used to store the computer program product provided that the volatile memory device is part of a system having a power supply, and the power supply or a battery provides power to the circuit for the time period during which the computer program product is stored on the volatile memory device.

For purposes of claim interpretation, the memory for storing a computer program product is "non-transient," where such a definition is given the broadest interpretation in terms of applicable memory types and techniques consistent with governing case law. Functions that are performed by a computer operable to process and execute the code may be equivalently performed by an electronic circuit.

Furthermore, it is common in the art to speak of software, in one form or another (e.g., program, procedure, process, application, module, algorithm or logic), as taking an action or causing a result. Such expressions are merely a convenient way of saying that execution of the instructions of the software by a computer or equivalent device causes the processor of the computer or the equivalent device to perform an action or a produce a result, as is well known by persons skilled in the art.

When describing a particular example, the example may include a particular feature, structure, or characteristic, but every example may not necessarily include the particular feature, structure or characteristic. This should not be taken as a suggestion or implication that the features, structure or characteristics of two or more examples should not or could not be combined, except when such a combination is explicitly excluded. When a particular feature, structure, or characteristic is described in connection with an example, a person skilled in the art may give effect to such feature, structure or characteristic in connection with other examples, whether or not explicitly described.

A non-volatile memory system 10, shown in a simplified block diagram in FIG. 1 may comprise an interface to the user system 5 and a processor 15 communicating with a flash memory array 20 comprising circuits having blocks of memory, each block comprising a plurality of pages. A random access memory 25, which may at least one of volatile memory or non-volatile memory (e.g., NVRAM) depending on the specific function, may be used as a buffer or working memory. The attributes of a flash memory array 20 (which may be termed an all flash array (AFA)) of low latency, and random read and write access may permit efficient and flexible application of such processes as deduplication, compression and encryption of the data, although each one of the processes consumes other system resources such as processing time line and internal data transfer bandwidth.

The user system 5 may represent a plurality of users each having differing storage requirements as to size of the data extent to be stored and the format in which the data is to be stored. The users may be in communication with the memory systems over a network, which may be a local area network (LAN), fiber channel (FC), the Internet, or the like. For convenience of description, one may describe the memory system capability made available to a user or using application as being embodied in a construct which may be termed a LUN. Traditionally this means logical unit number. Here we use the term to identify a storage extent that is made available to a user, where the storage extent may have specific attributes. For example the attributes may include quality of service (QoS) measures such as average and maximum read or write latency, bandwidth, storage capacity, or the like. The provisioning of the storage space may be described as "thick" or "thin", where the former is a situation where the LUN memory extent is predetermined and reserved for the user of the LUN "owner" and the latter is a situation where the memory extent at any time is determined by the amount of data being stored at that time. Where additional memory space is needed for a thin LUN, the space is allocated from a general pool of memory of the storage array and any limitations on the amount of memory that may be claimed by a LUN may be determined by a system policy. Each LUN may be provided with storage management functions such as replication, snapshots or the like, and the data itself may be deduplicated or compressed depending on user needs.

From an economic viewpoint, data deduplication and data compression are desirable as the user data may be stored in a substantially smaller data extent than the source data extent. It is believed that a typical user application will experience a reduction in data storage requirements of about 5:1 due to deduplication and about 2:1 for data compression, although these factors are known to be generalizations which may not be correct for a specific user LUN. However, the processing needed to perform these operations may introduce latency; and, the system architecture needs to accommodate a variety of data management tools contemporaneously and perhaps on a LUN-scale or even logical block address (LBA) granularity. There may be circumstances where LUNs that were deduplicated and compressed may need to be expanded, and where undeduplicated and uncompressed LUNs need to be deduplicated and compressed. Indeed, for example, a mirrored LUN may have one deduplicated and compressed form and another undeduplicated and uncompressed form simultaneously and the storage locations of each of the mirrored data may not be co-located.

Traditional constructs such as Network Attached Storage (NAS) and Storage Attached Networks (SAN), Direct Attached Storage (DAS) and the like are usually associated with specific data transport hardware and software protocols and interoperability of these constructs has been limited. A large memory array, such as an all-flash array (AFA), which may be a FLASH memory array 20, may be used for mixed workloads having the attributes of previous generation storage mechanisms since the scale size of an AFA may have available processing or storage resources substantially in excess of most individual user or application needs for processing capability and storage extent.

So, a user LUN, as used herein means some designated handle, tag or the like, by which a user addresses the storage system so as to read, write or otherwise manage data. The user LUN may be the client interface and include the QoS specification. Such data management activities may also include the operation of user programs within the memory system for any purpose, such as file management, transaction processing, data base management or the like. Each user LUN may have QoS features, data security and reliability features, management features such as clones and the like, that differ from any other LUN. User LUNs may be subdivided and assigned differing QoS requirements where, for example, the LUN is exposed to a user hypervisor and the memory system LUN is subdivided such that one or more virtual machines may be serviced by the sub-LUNs which may have differing QoS or other attributes.

The memory system may harmonize these requirements such that the resources are effectively used, taking account of the dynamic demands, for example, of the individual LUNs. Each user LUN may have a different diurnal, weekly, monthly behavior, including boot storms, accounting period closings, business transactions or the like.

We first describe the underlying architecture of an example of such a system when dealing with various data processing and storage activities, and then indicate some of the methods by which the performance of the described system may be adapted to the aggregated user demands.

For purposes of explanation some terms and acronyms are used which are similar, but not necessarily identical to traditional terms. Such terms are intended to be open in construction such that additional features may be present that are not specifically asserted to be included in the definition.

Figure 2:
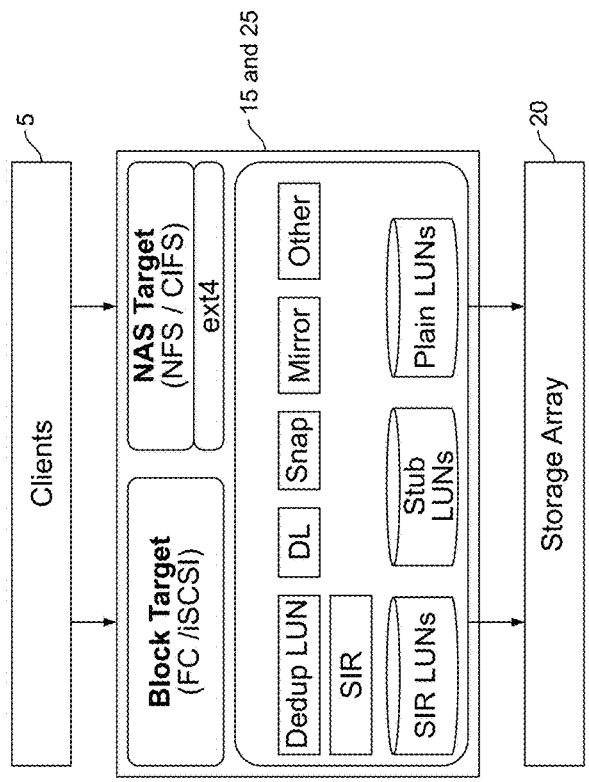
FIG. 2 illustrates an example of the allocation of functionality to hardware elements in the storage system.

A LUN corresponding to a user LUN may be operated as a traditional LUN, either thick or thin, where multiple instances of the data may be stored, or as a deduplicated LUN (DL). See FIG. 2.

In an example, the data of a DL is processed for deduplication in 4 KB blocks. Although this block size may correspond to a page size in some user applications, the data in the block may be comprised of a lesser size such as a plurality of 512 B chunks representing the user sector, page or block, or the block may be a portion of the user page, where the user page is larger than 4 KB. The choice of a deduplication block size is governed by a number of factors which may include, for example, the typical user page size, the amount of metadata needed to track the deduplicated data, and the method chosen for purging the deduplicated data when that data is no longer referenced by the users.

The deduplication processing includes computing of a hash value for the block. An example of a cryptographic hash function is SHA1. This is a 20-byte hash result which can be computed using the functionality of an Intel or other processor instruction set. Other hash functions may be used and choice of such a function is a trade-off between speed and uniqueness of the result in the context of the hardware and software environment. Other non-cryptographic hash functions may be used. Such non-cryptographic functions may necessitate a byte-by-byte comparison of the data with the stored data that would be pointed to so as to avoid erroneous identification of the data as having already been stored. For the greatest protection against data mismatch, a strong hash and data compare may be used. Such requirements may be a part of the QoS.

Deduplication involves storing a single copy of a data block to represent a plurality of identical data blocks being referenced by more than one user or user LBA, where the location of the stored data block is referenced through the deduplication metadata. The deduplicated data block is stored in a logical array called a "Single Instance Repository" (SIR). The actual SIR data may be stored in physical locations in the storage array 20 that may be intermixed with locations of non-deduplicated data in a physical data space. The data in the SIR has been deduplicated, but the SIR also contains single instances of the data where there is no duplicate data reference in the entire pool of user data being serviced by the SIR. The SIR may also have the hash value repository used to identify data that has been subject to the deduplication process whether the data is duplicate, or non-duplicate data.

Generally the operations being described herein are identified with logical data constructs and manipulations, so that apparently separate logical representations may be stored in the physical memory array in locations determined as is convenient at the time. The SIR may be part of a hierarchy where the referenced data is stored in a location in an AFA 20 that is associated with, but may not be co-located with, the SIR. Moreover, the SIR may be accessible by deduplication processes being performed on a plurality of clustered processors. So, a particular DL may be associated with a SIR instance stored on a remotely located AFA, as an example.

The SIR may therefore serve a plurality of clients, and the clients may reside in different physical or logical locations. Some clients may be responsible for data ingest, for replication or the like and others for performing housekeeping functions for the metadata, such as garbage collection (GC). Still others may be responsible for scrubbing (revalidating) the data to protect against data loss due to memory faults or data degradation over time.

Where the computed hash value of the data matches that of a previously stored data block, a duplicate of the data has been identified, and only metadata referring to the new data need be stored.

A storage system may compress the stored data, whether it has been deduplicated or not. A single compression algorithm such as LZO may be used, or an algorithm may be chosen from a plurality of algorithms such that the compression ratio is optimized, for example, to the data type or an aspect of the QoS. A single instance of the data resulting from the deduplication process is stored in the "Single Instance Repository" (SIR) and the data may be compressed for storage therein. The SIR represents the data that is subject to the deduplication process and represented by a hash value. As such each stored data element is "unique" and multiple occurrences of the data in logical address space are mapped to a single data element representation. Note that the present discussion presumes that the hash function is sufficiently robust that no two data sets will result in the same hash value. To the extent that a hash function is not believed to ensure that each stored data instance is unique, there are known methods of checking a hash match to avoid data loss or errors which may be used. The choice of a combination of the processes may depend on the user QoS requirements and on internal system policies that facilitate balancing of overall storage system resources.

The term QoS is intended to connote both express and implied user requirements and may be applied at various levels of granularity: e.g., a sub-LUN, a LUN or a grouping of LUNs. In addition to dynamically adjusting the deduplication and compression operations so as to meet QoS requirements, a pre-programmed time-varying QoS may be used. Such pre-programmed requirements may be aggregated for the system so as to define peak loading for purposes of avoiding over-commitment of resources at a specific time.

In another aspect, the user latency may be used to set a performance criterion that may be comprised of a plurality of internally defined latencies. While the user experience may be expressed as a latency at the system interface, the components of the latency may be comprised of, for example, the latency of the array in responding to read or write commands, the latency to perform deduplication, the latency to perform compression and the latency associated with GC. Each of these latency measures may be expected to vary, and not necessarily in the same temporal manner, as the dynamic data processing consumes varying amounts of system resources. Each of the latencies may be a component of a policy where the dynamic allocation of resources, including storage memory may be used to fulfill the user QoS requirement. Alternatively, the various LUNs may be assigned a relative priority.

In an example, a deduplicated LUN (DL) may be comprised of a logical connection to a SIR and a stub LUN (SL) whose purpose is to manage the user-LBA-to-deduplicated data mapping using metadata. In other examples, the SL may also reference or actually contain data. The DL may have a size determined by the user, but may be thin provisioned, as the amount of space associated with the SIR may not be bounded. A fixed number of bytes of the SL, perhaps 32 B, may be used to describe each 4 KB user block and the SL may be configured as a thin LUN so as to adapt to the actual data storage needs.

Figure 3:
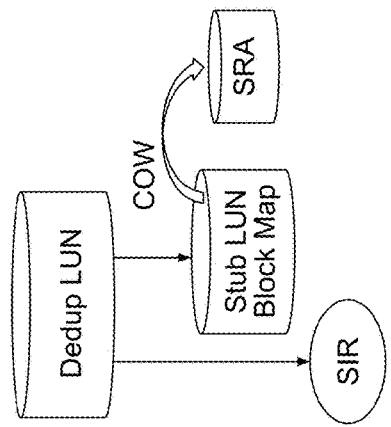
FIG. 3 illustrates an example of the operation of a deduplicated LUN during a snapshot operation.

In an example, the data storage process may include receiving I/O operations from the user and assembling sufficient data to be stored to fill a 4 KB block stored temporarily in NVRAM, which may be redundant. NVRAM any be considered to represent any storage medium where the data is protected from loss due to a power failure. Each user request may be promptly acknowledged since the data has been securely stored. The block is hashed and a lookup is performed to determine if the data is already within the SIR. If the data is already stored, the SL may be managed to associate the LBA with the SIR data location. Otherwise, the data is stored in the SIR and metadata created. A DL may have an associated SRA (snapshot resource area) so that snapshots may be performed where the SL is copy-when-written (COW) to the SRA when new data is written after the snapshot (FIG. 3). As such no actual data is moved, just the referencing information. Similarly the DL may be cloned by cloning the SL contents without moving the referenced data. Data may be erased or overwritten by modifying the referencing information.

The LUN may be mirrored so that the DL points to another (target) DL or a conventional LUN (that is non-deduplicated). The mirror DL may have a separate SIR or use the same SIR as the source DL. Data may need to be moved from the source SIR to the destination SIR if they were different SIRs and, for example, a hash lookup indicated that the data was not already present. As the data is being moved, the target SL would be updated. The target DL may be co-located with the source DL or may be remotely located.

As mentioned, the SIR itself may store data on conventional (non-deduplicated) LUNs on the AFAs. These LUNs may be encrypted, backed up, or have other conventional activities performed thereon. Moreover, such LUNs may be either thick or thin provisioned. So, either a common SIR may be maintained for all of the stored data, or a plurality of SIRs may be maintained where each SIR may be associated with one or more DLs. As is evident from this discussion, a LUN may be defined at various levels in a storage system, but the each LUN may be selectively exposed to other LUNs or to the user at differing levels of the storage system.

As the data in a SL needed to describe the stored data (location, number of references) of a deduplicated block may be small (e.g., tens of bytes) a plurality of such updates to the SL may be batched and atomically stored to the SL. The user application often exhibits LBA locality and this may improve efficiency when the metadata from such LBAs has been grouped in the SL.

Over a period of time, some of the stored data may be modified or deleted by the users. Where the user page size equals that of the deduplicated block, for example, the data may be deleted from the SIR when the data is no longer referenced by any user LBA. This deletion may be deferred until scheduled or event-driven maintenance operations are performed on the SIR. Deletion of the underlying data is termed garbage collection (GC). This should be distinguished from the garbage collection activity that also may occur on the AFA in managing the flash chips, where blocks of physical pages are erased to free up physical memory space. Here, the block is still being treated as a logical entity and the GC is being performed with respect to the logical space.

When the individual user I/O operations are of less than a deduplication block size, a type of logical space fragmentation occurs. For example, in a 4 KB (or KiB) block comprised of a plurality of individual 512 B user I/O operations, one or more of the 512 B segments of the block may be deleted or modified. (Note that, without loss of generality, the distinction between binary and decimal measures of the size of data elements would be understood to refer to whatever the actual stored or processed data may be. However, it is somewhat awkward to use decimal descriptions below about 4096 bytes.) So, an input block having only one different 512 B segment will not have the same computed hash value as the existing block and will be treated as a new unique data block, even though 7 of the 8 segments are unchanged with respect to a previously deduplicated block. The garbage collection process needs to periodically or aperiodically scan the SLs so as to identify the situations where two or more SIR blocks are referenced by the same user LBA and determine which is the obsolete data. The SIR block with the obsolete LBA reference may need to be read and processed so as to either insert the new LBA data in place, or the valid LBA redistributed so that the modified or deleted segment may be excised from the SIR. This excision process may be performed asynchronously with the process of data storage and retrieval so as to purge the SIR of obsolete data of a size that is the same or commensurate with the deduplication block size.

When a deduplicated data chunk has been completely de-referenced, deletion of the data from the SIR may be in accordance with a protocol where the deletion is delayed, if there are sufficient resources to retain the data. This may reduce the computational activity where only a few LUNs reference the data, but the frequency of referencing the data with the particular hash value is high. One way to reduce churning of the SIR is to adjust the periodicity of the GC so as to leave some of the more recent de-referenced data blocks in the SIR, rather than immediately evicting the blocks.

So, when data is ingested into the storage system from a user, the user LUN designation determines the type of processing to be performed. Data management services such as replication, snap shotting and the like may be performed on the data as received, and the data for each LUN may then then be blocked together for storage either as deduplicated, non-deduplicated data that is compressed or not compressed as appropriate to the LUN specification. In an alternative, the incoming data may be processed on a global basis.

System resources are limited, in any practical system. So unless the system is substantially overprovisioned (either with respect to storage capacity, processing capacity, interface capacity, or the like) the temporal variation in demands by the users may result in transient system bottlenecks. Yet, it is an objective of a modern storage system to appear to be substantially immune to such shortfalls. Operations such as deduplication and compression, for example, consume system processing resources, memory resources and internal bus bandwidth.

Where the volume of data to be deduplicated and compressed exceeds the processing capacity at a time, for example, some or all of the data being written or replicated or otherwise added to a DL may be stored in the form that it was received. Where this expedient is resorted to, the system latency may not be compromised; however, the storage efficiency may be temporarily less that desired. When the system resources permit, the un-deduplicated data in the DL may be post-processed so as to determine whether a duplicate does actually exist. If there is a duplicate then the appropriate SIR location is referenced, freeing up the space.

The architecture of the stub LUN (SL) may be organized as a file system where the mixture of metadata for deduplicated or non-deduplicated data is stored. Each deduplicated block may be described by a DDU (deduplication data unit), which is the metadata for a de-duplicated chunk, which may be smaller than a deduplicated block. Each of the DDUs points to a physical storage location, usually through several levels of indirection and the data may be either duplicate data or unique data. Each of the stored chunks may be compressed or not, in accordance with a policy.

During background processing data that is non-deduplicated may become de-duplicated, for example, and the DDU may point to the location of the de-duplicated data in the SIR.

Various administrative operations are facilitated by the storage architecture. In an example, a LUN having non-deduplicated data may be converted into a DL. One could associate a new DL as a mirror target with an existing non-deduplicated LUN and perform a syncing process, including deduplication of the mirror DL. Once this has been completed, the mirroring link may be broken and the original non-deduplicated LUN deleted.

In another aspect, deduplication of a non-deduplicated LUN may be performed in place. The LUN would be associated with a SIR and the contents of the LUN ingested through the input deduplication path. Data chunks that are de-duplicated may be replaced with stub metadata (DDU). Once the process is completed, the source LUN is now the stub LUN (SL). Since the number of entries in the SL is less than the number of entries in the DL, the DL can be thinned out. Where SCSI commands can be used, UNMAP commands may be used, as an example. Incoming read commands during processing would be directed to the DL or the original LUN as appropriate. Incoming write operations may be processed for deduplication according to the QoS requirements.

One may envisage that the reverse process may be performed. In the mirroring example, a DL can be mirrored to a LUN and after synchronization the mirror is broken and the source DL deleted.

The deduplication process may be disabled, either by the user changing the QoS requirements, or in accordance with a system policy so as to maintain QoS across a plurality of user LUNs. This may be done by the system assigning an additional LUN that is associated with the existing DL. The entire DL may be processed so as to create a LUN having undeduplicated data. Alternatively, the incoming write data is directed the undeduplicated LUN and incoming reads directed to the DL of the deduplicated LUN as appropriate at the time of the operation. Where the use of this additional LUN is for the purpose of load balancing, the data stored in the LUN may be processed for deduplication as previously described so as to free up memory and logical space.

A person of skill in the art would appreciate that the examples above provide methods where the storage system may balance resources while providing a separate QoS, for example, to each of the user LUNs, and such methods may be used in a variety of useful configurations, only some of which have been described in detail.

One may consider a configuration where all of the available physical storage of a memory array is a global resource or storage pool. Storage is allocated from the global pool to service LUNs (thick or thin) as and when they are needed to meet the requirements of the LUNs exposed to the user. System-allocated LUNs such as DL make use of the storage allocated from the global pool.

A deduplicated LUN (DL) may be thought of as the LUN and a stub LUN (SL) where the SL is metadata that tracks the location of the deduplicated data in the LUN. The deduplicated data may be stored in a global LUN such that only a single instance of a particular deduplicated block is stored, regardless of the source of the data. Generally the storage efficiency of the deduplication process is improved as the size of the common deduplicated data set increases as common data between a plurality of LUNs is only stored once. There may be practical limits on the common data pool and a plurality of such SIRs may be established. Further, where there is a concern about data security, the SIR may be restricted to a particular family of user LUNs.

Deduplication may not therefore be a property of a LUN, but may be the state of a block of a LUN at any particular time, and that property may be changed by a system process depending, for example, on storage utilization, deduplication efficiency and current throughput or latency requirements.

Each LUN exposed to the user may be characterized by the user-expressed requirements of storage capacity, QoS and the like, as well as experiential information such as average deduplication factor and average compression factor. Other time varying characteristics such as average and peak write and read requirements may be determined either continuously or periodically. From the ensemble of such LUN characteristics, the throughput capability and memory may be allocated by a storage system so as to make efficient usage of the storage and processing capability. Other processes such as GC and observable parameters such as churn rate or the like may also be considered in establishing system policies.

Transient peak requirements for writing to a LUN may be met either by processing the data in a routine manner or by temporarily altering the process without visibility to the user. For example, if the latency for writing data is increasing due to the combined writing operations of a plurality of users, some of the data may be directed temporarily to un-deduplicated LUNs and when the writing load decreases, the data may be post-processed so as to drain the data out of the un-deduplicated LUN into the associated DL using techniques that have already been described, or similar approaches. Reading of data is less affected by deduplication processing as the reading of data is primarily a matter of looking up the data physical location using the already composed metadata.

However, similarly, maintenance operations such as GC, as background processes may be allocated more or less of the processing timeline depending on the foreground processing load and the urgency of the background process.

Figure 4:
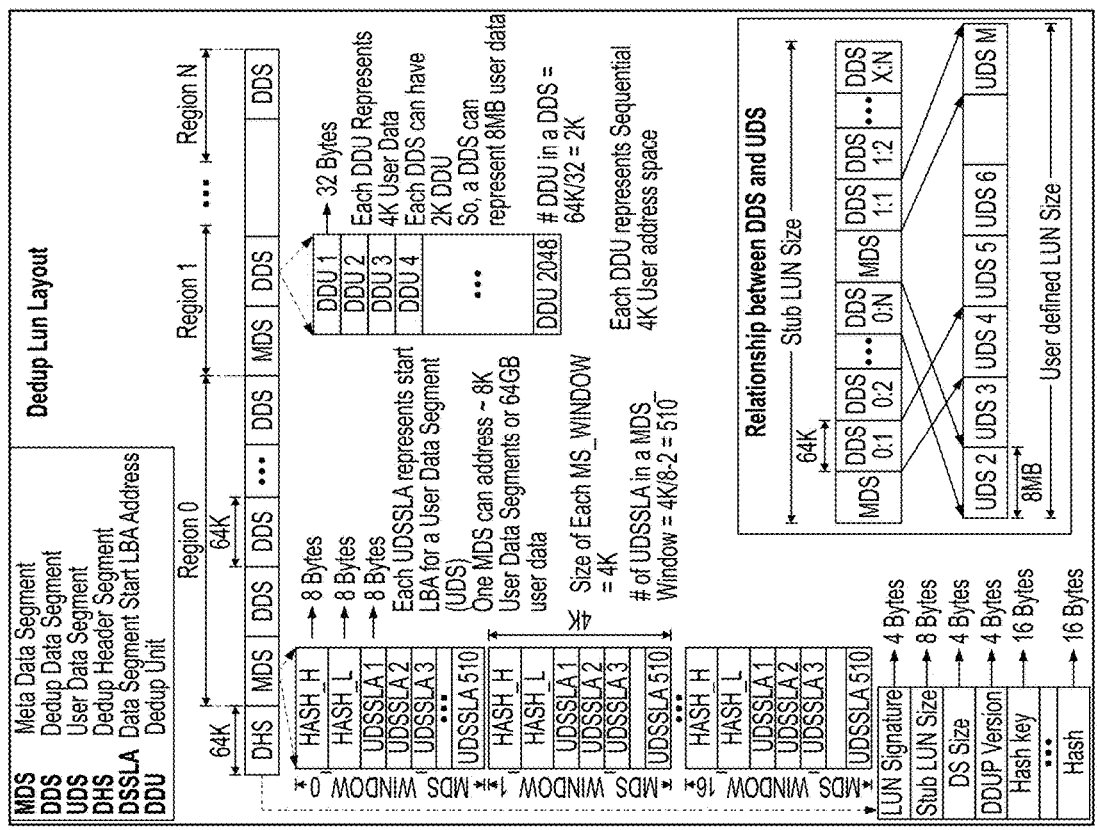
FIG. 4 illustrates the relationships in a data structure that may be used to organize the metadata in a deduplicated LUN.

In an aspect, data addressed to a DL may be deduplicated with respect to the contents of the SIR and optionally compressed inline. The stub SL stores the meta-data, while the actual data is stored in a SIR LUN. The metadata stored in SL facilitates the retrieval of user data for read operations. In an example, shown in FIG. 4, a SL for a DL may be comprised of a plurality of data structures commencing with a header segment (DHS) and partitioned into a plurality of regions. The DHS may include a LUN identifier, SL size and information related to the hash function used. The space following the DHS may be divided into a plurality of regions, which may be of equal size and comprise a metadata segment (MDS) and a plurality of deduplicated data segments (DDS). The metadata segment contains information of user addressable LBAs that have already been written to and may be divided into, for example, 4 KB chunks, which may be called a MDS_Window. This structure is primarily used to store the start address of the user data segment (UDS). The size of an MDS may be 64 KB, for example and there may be 16 MDS_Windows for each MDS.

The entire user addressable space (the LUN size) may be divided into segments of a fixed size and each of them may be referred to as a UDS. The start address of a segment is stored in the MDS when a write is performed to an address that is within the segment and the LBA start address may be referred to as a UDSSLA. The UDS may be, for example 8 MB. Where sizes of data and metadata are given, they are not meant to be limiting. Rather they are provided to assist in understanding the concepts by providing a relative sizing of elements of a relatively small example.

Deduplicated data segments (DDS) follow the MDS in the LUN layout where there multiple corresponding DDS which are fixed in size and correspond to a UDS. The size of a DDS may be 64 KB, for example. The DDS may contain 32 B data structures referred to as DDU (deduplicated data units) that may contain information on the location of data in the SIR for a 4 KB address range. The metadata of a DDU may comprise, for example, the compressed length, the uncompressed length, the SIR identification, a cyclic redundancy code (CRC) for data protection and the hash value.

Since a large capacity AFA (All Flash Array) or analogous technology memory system may be employed to service a diverse set of users (clients) having differing QoS requirements at the interface with the client, such as LUN size and data formats, which may, from a memory utilization efficiency viewpoint, be represented by shared deduplicated and compressed stored data, the internal processing by the AFA needs to fully respect the QoS requirement at the user defined client interface In an example, for each user interface, which we generically call a LUN, the QoS and data format (e.g., block or file) will determine the detailed data flow and processing steps. The processing steps may often be performed simultaneously or contemporaneously, or sequentially with other steps, and depending on the specific system needs at the time may be deferred or omitted. Where a user QoS does not specify deduplication or compression, the system may optionally employ deduplication and compression, providing that the interface QoS is maintained. The processing of the received data for the such a LUN may be merged with that of users specifying deduplication so that all of the data is accessed through a single SIR repository. However, this may result in overall resource management complications, and a separate SIR specifically to service the user LUN may be created. While this may be less space efficient overall than a global SIR, the response to user requests is likely to be more effective. So, the user achieves a latency QoS requirement, for example, while the supplier of the storage capacity gains the efficiency of storage associated with deduplication and compression. The data format associated with the LUN (user) may be explicitly specified in the LUN definition, incoming data may be parsed for commands so that file operations or operations on multiple blocks may be performed by specialized intake modules.

In another aspect, the association of a local SIR with a user LUN may be advantageous in assessing the properties of the user application and data so that further decisions can be made based on observable data, particularly for a newly allocated LUN or user. By collecting information on the deduplication efficiency, the compression factor (and even which of several compression algorithms may be most effective), the automated planning of system resources may be facilitated. Moreover, the continuing comparison of these processing efficiency factors with the system decision criteria may identify temporal patterns in the user activity, such a business hours, closing of accounting books on a daily or monthly basis, or the like, permitting a forecasting of total system load. At a later time the local SIR may be merged with the global SIR.

So, a LUN that has a QoS that does not require deduplication may be represented by an internal LUN which is managed, for example, with a local SIR. When this processing load has a deleterious effect on the latency of the LUN response or must be curtailed due to system loading considerations, the ingested data may be processed as undeduplicated data, or even diverted to a buffer LUN for purposes of subsequent processing. This type of deferred processing of data to be stored is different from the deduplication and compression process performed on conventionally stored (undeduplicated and uncompressed) data during data backup operations, such as batch or streaming to tape drive system.

When deferred processing is being performed on buffered data, the data may be considered to be re-ingested into the memory system so as to apply the interface QoS requirements and the buffer may be drained for this purpose while continuing to buffer later input data so as to maintain a simple constraint on the time ordering of executing of LUN operations.

Where the user data has associated RPC (remote procedure call) information or similar tags, this may determine the process flow. Where the data is represented by metadata in an SIR pointing to a single instance of storage for multiple user LUNs the operations needed may be performed on the metadata without affecting the stored data directly. This is a benefit that arises due to the sharing of a single storage location by a plurality of LBAs of a single user or by a plurality of users. Once the stored data itself is isolated in this manner, many data storage operations may be performed on the SIR metadata rather than manipulating the stored data itself. Operations such as TRIM are performed by deleting the linkage between the LUN LBAs and the associated SIR metadata and by deleting the metadata associated with the deleted LUN LBA. Whether the actual stored data is to be deleted need not be determined at this time as it may be deferred until performance of a metadata garbage collection, a physical memory garbage collection cycle or similar event. Since these operations are typically performed as background operations, the impact on the processing load is reduced.

Similarly, such system maintenance functions as snapshots and cloning can be performed primarily through manipulation of metadata. In an example, a snapshot of a user LUN may be performed using a copy-on-write method where the SIR metadata associated with the LBA being written to is copied to a snapshot LUN associated with the user LUN. The new data to be written is processed in accordance with the current status of the input QoS. If that status results in deduplication, for example, the SIR is searched to determine if the new data to be written to the LBA is already stored in the physical memory array. If it is, only the SIR metadata need be updated and a write operation is saved. If the data is unique, the data is stored in physical memory and the hash value associated with the LBA.

A person of skill in the art that an Extended COPY (XCOPY) command, is useful to copy a set of LBA locations from one user shared client to another. In an example, an update to a plurality of user applications may be performed by storing a file to be shared using the deduplication process, and then modifying the metadata that has been created so as to add the LBAs to which the file is to be copied.

A person of skill in the art will notice that a COMPARE_AND_WRITE operation is useful to atomically update a counter or other such variable in a shared LBA location in the presence of multiple competing users. In example, a request to update a deduplicated location in this way may be performed by utilizing and updating the metadata.

The data processing for deduplication may be described in terms of the actions taken for a single LUN and where the SIR is shared by a plurality of LUNs having deduplication as a QoS requirement. However, the deduplication (and compression) process has aspects that need to be addressed on a system basis in order to make most effective use of system resources. Any such description of a system-wide schema is a simplification for purposes of explanation and would omit corner cases, start-up, exception handling, controlled or uncontrolled shut-down, pathological situations or the like. These aspects would be addressed as details of the implementation of the design, as would be recognized by a person of skill in the art.

One may think of a modern memory system as serving a plurality of diverse users (clients), each user having different requirements (QoS) for the service being performed by the serving memory system. Only the storage aspects of the serving system are being described and the system itself may provide other functions including file management, database management, or the like. As described above, the plurality of clients have individual QoS requirements that may be expressed as parameters in a template associated with the allocation of a service interface which we, for convenience, term a LUN. Other constructs may be used, and a person of skill in the art will appreciate that these constructs may have different names, now or in the future. But the user will expect to be able to address the data stored in memory so as to be able to store and retrieve the data. For discussion purposes, the user may consider a LUN to comprise an extent of memory where the specific data location is characterized by a starting Logical Block Address (LBA) and a length. An attribute of deduplication using a SIR spanning a plurality of LUNs is that the data that is stored may represent all of the instances of the data for the plurality of LUNs without uniquely associating the stored data with a specific LBA of a specific LUN. This decouples the user from the physical memory by use of indirection in addressing, perhaps in an analogous way that the Flash Translation Layer (FTL) can decouple the LBA of a Flash disk from the physical location of the data on the Flash memory chips. By doing this, global processes such as Flash garbage collection and wear leveling are performed across the memory system as an efficient background process. Similarly, deduplication and the use of the SIR decouples each user from the physical storage of the data of a LUN and manipulates the metadata of the SIR and the LUN to perform most functions, decreasing the required memory space, writing requirements and the like.

Once a chunk of data has been deduplicated and entered into the SIR, further instances of the data are represented by metadata updates, even if the data represents data of independent LUNs. Once added to the SIR, further operations, including writing of additional instances, erasing or modifying the data proceed independently of the management of the physical storage media. Ultimately, if the data is not needed by any of the clients, having been de-referenced by virtue of being logically erased (e.g. TRIM) or being replaced by new data stored in the logical memory location, a logical garbage collection operation may release the physical memory location for physical garbage collection.

Since the deletion of a SIR entry for a specific hash value is done when all of the references to that value have been deleted, the action of changing the reference for a particular LUN proceeds independently of changes in other LUNs. Processing of commands for non-overlapping operations on a LUN does not need to be performed in an ordered manner. Processing for overlapping operations is performed in an ordered manner, for each of the overlapping instances individually.

Overlapping operations can occur for a LUN as the operations may share a LBA space in whole or in part, but are non-overlapping where the operations are in different LUNs. Since write and erase operations on the physical memory are significant factors in memory lifetime or wear out, the sharing of data by deduplication results in a significant reduction in the wear process as well as decoupling the management of individual LUNs from the background operations associated with maintaining the metadata of the SIR.

Such background operations, which may be termed logical garbage collection, prevent the exhaustion of physical memory, for example, by identifying stored data that is no longer referenced by any of the clients so that the data location may be identified as obsolete for purposes of physical memory garbage collection. A more granular approach may also consider the number and time history of references to a particular hash value as determining the hot or cold status of valid data represented by the hash value and this may inform the location of the hash value entry in lists or tables to be searched during the deduplication process.

In addition to the QoS requirement, which is a formal statement of performance and functional criteria which are to be met, each client (LUN) exhibits different data dependent properties. That is, the data for virtual desktops differs from that of a data base, or a video server or the like. So, the data presented to the client-LUN interface by each client may have significantly different properties as to redundancy (e.g., deduplication ratio, compressibility). So, the allocation of processing resources on a system-wide basis may have significant variability for a simple QoS requirement (deduplication, compression).

At the communications interface between the memory system and a user, which may be an industry standard interface such as SCSI, FibreChannel or the like, or a special interface mutually agreed upon, or which may be developed in the future, the client requests for reading and writing data or performing other operations on the stored data are parsed and processed. Typically each user issues such commands and waits until the command has been acknowledged before proceeding. Acknowledgement of the correct receipt of data in the context of a storage system includes the assurance that the data has been stored in a permanent way that precludes data loss. Only then does the client proceed with another operation. The size of the data transfer, or the operation of independent threads is not limited by this requirement.

Part of the performance capability of the system is thus determined by the speed with which the received commands and data can be acknowledged and responded to. Simply providing a large non-volatile buffer or non-volatile storage device is inadequate, as a person of skill in the art will recognize that this is un-economic and is an underlying reason for the development of deduplication and compression techniques.

In an aspect, the data received to be stored in a LUN where the QoS includes deduplication may be stored in an input buffer prior to processing for storage. This buffer may include volatile memory such as DRAM for high-speed operations and non-volatile memory for purposes of providing low-latency acknowledgement, with further processing proceeding independently of the client. The memories are typically logically allocated to LUNs and functions.

Each input/output (I/O) may be allocated a local sequential serial number to order the processing of commands so that earlier commands are processed before later commands so as to preserve the data integrity. However, this ordering may impede such processes as deduplication, compression and the like, which may have different resource demands on a LUN and temporal basis. Desirably, the routine processing of deduplication and compression would be done on data set that comprised all of the stored data for all of the LUNs so as to level the demands.

But, out-of-sequence operations could result in data corruption. Yet, the situation where this may occur is generally infrequent and may be considered an exception, that if properly addressed, can reduce the misallocation of processing and storage resources.

It does not matter that two different LUNs may be writing the same data values to different logical memory locations simultaneously. The only manifestation of this action would be that the metadata for the particular hash value in the SIR would be linked to two different LUN/LBA pairs, providing the correct referencing. Similarly, operations that would erase or modify stored data only modifies the SIR metadata associated with the LUN requesting the operation.

Each command for a LUN LBA is parsed and associated with the I/O request and may be stored in a I/O buffer manager (JOB). The specific LBA remains in the IOB until the commanded operation associated therewith has been completed. That is, the IOB may persist the information identifying the LBA as an in-process operation after the acknowledgment has been sent to the client and the information may remain in the IOB until the processing steps have been completed (e.g. deduplication, compression, updating metadata). The command and data may be stored in an input buffer (IB) and dequeued based on system process throughput. In an aspect, after the input data processing for a LUN LBA has been completed (e.g., the SIR data updated or a new SIR hash value corresponding to unique data has been established in the SIR), the LUN LBA value may be deleted from the IOB so that future commands directed to the LUN LBA are initially treated as non-overlapping operations.

Each new I/O request for the LUN is processed and entered into the JOB. If the IOB already contains the LBA (including some or all of the extent of the data) there exists an overlap of operations where the later command may have different data than the earlier command. If these two instances are executed out-of-order, data corruption can occur. It may be possible to compare the data of overlapping commands directly while in the IOB or a common buffer and, if the data is the same, eliminate the duplicate. However, if the data is not the same, the overlapping commands must be executed sequentially to preserve data integrity. So, rather than burdening the entire processing process with a sequential requirement, the overlapping commands may be removed to a separate buffer where they may be executed. This sequential operation buffer may be local to the LUN or global.

On the time scale of storage operations, the occurrence of such overlaps are not expected to be frequent. Consequently most of the operations, on a global basis, do not have to be sequential in order to preserve data integrity. All of the operations (deduplication, compression) may be combined in a single buffer or multiple buffers where each buffer may service a different chain of operations or a different processor. In this manner the processing load can be leveled and the resources efficiently used.

A non-volatile buffer associated with each LUN may also be used to manage the data flow between the system and the client so as to avoid exhaustion of resources. The size of the buffer may be determined by the QoS requirement, and when the buffer reaches a predetermined occupancy, the system may introduce a delay in the acknowledgement or response so as to throttle the flow. As previously discussed, if these measures do not alleviate a temporary system processing or buffer overload, the commands may be diverted to an overflow buffer, or even written in the form received to the memory system. At a later time this data may be processed by reading the data and flowing the data through the IB taking account of the QoS requirements.

In another aspect, the flow of data from the client to a particular LUN may be managed by sending a negative acknowledgement of a type that will result in a retransmission of the command by the client.

A person of skill in the art would understand that the operation of the SIR and the input data processing may be relevant to all of the LUNs of a memory system or selected LUNs of a memory system and it may be possible to configure the system to transition LUNs between the deduplication process and the straightforward non-deduplicated storage in accordance with system requirements and changes in QoS requirements for the LUNs.

When methods are described it should be understood that the ordering of the steps is illustrative and steps the method may be combined, omitted, reordered, repeated or the like without departing from the teachings of the disclosure. Similarly, in the claims, the use of letter or numerical identification of clauses is for clarity in description and does not imply a restriction on the sequence of performance of the steps in the method.

Although the present invention has been explained by way of the examples described above, it should be understood to the ordinary skilled person in the art that the invention is not limited to the examples, but rather that various changes or modifications thereof are possible without departing from the spirit of the invention.

What is claimed is:

1. A method of managing a memory system, comprising:
providing a processor and storage memory;
allocating a logical unit (LUN) of a plurality of LUNs to a client;
receiving a command to write data to the allocated LUN;
determining if the allocated LUN is configured for deduplication;
if the allocated LUN is not configured for deduplication, process the command by storing the data in the storage memory and creating metadata referencing a storage location of the data that is written to the storage memory;
if the allocated LUN is configured for deduplication, performing deduplication of the data and creating metadata referencing the location where the deduplicated data is stored; and
storing the metadata for the deduplicated data for a plurality of LUNs in a single instance repository (SIR), and storing a single instance of the deduplicated data in the storage memory.

2. The method of claim 1, further comprising:
for each LUN of the plurality of LUNs configured for deduplication:
accepting a write command and data from an associated client in an input buffer memory;
maintaining a status buffer memory identifying a logical block address (LBA) of each received write command;
determining if the LBA of the write command is present in the status buffer memory; and,
if the LBA of the write command is present in the status buffer memory, determining that the write command is an overlapped write command; or,
if the LBA of the write command is not present in the status buffer memory, determining that the write command is not an overlapped write command.

3. The method of claim 2, further comprising:
maintaining a common deduplication buffer memory for a plurality of LUNs;
processing the non-deduplicated write commands in the common deduplication buffer memory for the plurality of LUNs for deduplication where the order of processing of commands is in accordance with a policy;
processing the overlapped write commands in sequential order; and
deleting the LBA of the write command from the status buffer memory when the deduplication process for the write command has been completed.

4. The method of claim 3, wherein the policy for processing non-deduplicated data does not include processing write commands in sequential order.

5. A method of managing a memory system, comprising:
providing a memory system with a processor having a client interface, buffer memory, and storage memory;
allocating a logical unit (LUN) of a plurality of LUNs to the client, the allocated LUN having a QoS specification;
receiving a command to perform an operation to the allocated LUN;
determining if the QoS specification for the allocated LUN includes deduplication and:
if the QoS specification does not include deduplication, process the command; or
if the QoS specification includes deduplication, determine if deduplication is possible while meeting the QoS specification and:
if deduplication is possible, performing deduplication of the data and creating metadata referencing the storage location where the deduplicated data is stored; or,
if deduplication is not possible, storing the data in a backing LUN associated with the allocated LUN, and
draining the data stored in the backing LUN when deduplication is possible by re-ingesting the data from the backing LUN and processing the commands in accordance with the QoS specification.

6. The method of claim 5, further comprising: storing metadata for deduplicated data for a plurality of LUNs in a single instance repository (SIR), and storing a single instance of the deduplicated data in the storage memory.

7. The method of claim 6, further comprising:
for each LUN of the plurality of LUNs having a QoS that includes deduplication:
accepting a command from the client in an input buffer memory;
maintaining a status buffer memory identifying the LBA of each received command;
determining if the LBA of the command is present in the status buffer memory; and,
if the LBA of the command is present in the status buffer memory, determining that the command is an overlapped command; or,
if the LBA of the command is not present in the status buffer memory, determining that the command is not an overlapped command.

8. The method of claim 7, further comprising:
maintaining a first common buffer memory for non-overlapped commands of the plurality of LUNs;
maintaining a second common buffer memory for overlapped commands of the plurality of LUNs;
processing the non-overlapped commands in the first common buffer memory for the plurality of LUNs from the input buffer memories where the order of processing of commands is in accordance with a policy;
processing the overlapped commands in the second common buffer memory in sequential order; and
deleting the LBA of the command from the status buffer when the command has been completed.

9. The method of claim 8, wherein the policy for processing non-overlapped commands does not include processing commands in sequential order.

10. The method of claim 9, wherein the command is at least one of a WRITE, TRIM, UNMAP, WRITE_SAME, COMPARE_AND_WRITE or XCOPY command.

11. The method of claim 10, wherein overlapped commands for a first LUN are processed independently of overlapped commands for a second LUN.

12. The method of 7, wherein when a first command and a second command are determined to be overlapped:
    comparing the first command and the second command to determine if the commands result in a same change in the data or metadata for the LBA;
    deleting one of the first command or the second command; and
    processing the remaining one of the first command and second command as a non-overlapped command.

13. A memory management system, comprising:
    a storage memory; and
    a processor configured to:
    store metadata for deduplicated data for a plurality of logical units (LUNs) in a single instance repository (SIR);
    store a single instance of the deduplicated data in the storage memory;
    for each LUN of the plurality of LUNs:
        accept commands in an input buffer memory;
        maintain a status buffer memory identifying the logical block addresses (LBA) of each received command;
        determine if the LBA of the command is present in the status buffer memory;
        if the LBA of the command is present in the status buffer memory, determine that the command is an overlapped command; and
        if the LBA of the command is not present in the status buffer memory, determine that the command is not an overlapped command.

14. The memory management system of claim 13, the processor further configured to:
    maintain a first common buffer memory for non-overlapped commands of the plurality of LUNs;
    maintain a second common buffer memory for overlapped commands of the plurality of LUNs;
    process the non-overlapped commands in the first common buffer memory in non-sequential order;
    process the overlapped commands in the second common buffer memory in sequential order; and
    delete the LBA of the command from the status buffer when the command has been completed.

15. The memory management system of claim 13, the processor further configured to process overlapped commands for a first LUN independently of overlapped commands for a second LUN.

16. The memory management system of claim 13, the processor further configured to:
    determine a first command and a second command as overlapped commands;
    delete one of the first command or the second command when the commands result in a same change in the data or metadata for the LBA; and
    process the remaining one of the first command and second command as a non-overlapped command.

* * * * *